(12) United States Patent
Ou et al.

(10) Patent No.: US 12,353,252 B2
(45) Date of Patent: Jul. 8, 2025

(54) ELECTRONIC DEVICE

(71) Applicant: GETAC TECHNOLOGY CORPORATION, New Taipei (TW)

(72) Inventors: Po-Yi Ou, Taipei (TW); Kao-Wen Chang, Taipei (TW); Fang-Ping Cheng, Taipei (TW); Kuang-Yeh Chang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 204 days.

(21) Appl. No.: 17/982,405

(22) Filed: Nov. 7, 2022

(65) Prior Publication Data

US 2023/0259176 A1 Aug. 17, 2023

Related U.S. Application Data

(60) Provisional application No. 63/309,470, filed on Feb. 11, 2022.

(30) Foreign Application Priority Data

Aug. 18, 2022 (CN) .......................... 202210994622.5

(51) Int. Cl.
*G06F 1/16* (2006.01)
(52) U.S. Cl.
CPC .......... *G06F 1/1679* (2013.01); *G06F 1/1616* (2013.01)
(58) Field of Classification Search
CPC ....... E05C 9/045; G06F 1/1679; G06F 1/1616
See application file for complete search history.

(56) References Cited

U.S. PATENT DOCUMENTS 11,009,915 B1 * 5/2021 Akiyama .............. G06F 1/1656
2006/0125585 A1 * 6/2006 Lo ........................ G06F 1/1616
335/205

(Continued)

FOREIGN PATENT DOCUMENTS

CN 207497283 U 6/2018
CN 108445969 A 8/2018
(Continued)

OTHER PUBLICATIONS

European Patent Office, Search Report, Application No. 22209072.2, Jun. 22, 2023, Germany.

*Primary Examiner* — Anthony Q Edwards
(74) *Attorney, Agent, or Firm* — Cooper Legal Group, LLC (57) ABSTRACT

An electronic device includes: a casing, including a first side surface and a second side surface parallel to each other; a positioning column, including a first end portion and a second end portion having a first plane and a first convex portion; and an operating member, assembled on the casing and corresponding to the positioning column, and including a push portion having a second plane and a second convex portion. When the operating member is at a first position, the first convex portion correspondingly presses against the second plane, the second convex portion correspondingly presses against the first plane, and the first end portion is accommodated in the casing. When the operating member is at a second position, the first convex portion correspondingly presses against the second convex portion, and the first end portion protrudes from the first side surface of the casing.

20 Claims, 11 Drawing Sheets

(56) References Cited

U.S. PATENT DOCUMENTS

| | | | | |
|---|---|---|---|---|
| 2006/0133019 A1* | 6/2006 | Yamazaki | ............. | G06F 1/1679 |
| | | | | 361/679.21 |
| 2008/0253094 A1* | 10/2008 | Doczy | ..................... | E05C 9/045 |
| | | | | 361/726 |
| 2013/0250501 A1* | 9/2013 | Guo | ...................... | G06F 1/1679 |
| | | | | 361/679.01 |
| 2015/0108030 A1* | 4/2015 | Yin | ........................ | A45C 13/36 |
| | | | | 206/521 |
| 2018/0261259 A1 | 9/2018 | Shiu et al. | | |

FOREIGN PATENT DOCUMENTS

| | | |
|---|---|---|
| CN | 210639543 U | 5/2020 |
| TW | 384655 | 3/2000 |
| TW | M322013 U | 11/2007 |
| TW | I314678 B | 9/2009 |
| TW | M380504 U | 5/2010 |
| TW | I381795 B | 1/2013 |
| TW | I416303 B | 11/2013 |
| TW | M615842 U | 8/2021 |
| WO | WO 2006/117858 A1 | 11/2006 |

\* cited by examiner

ELECTRONIC DEVICE

The application claims the benefit of a U.S. Provisional Patent Application No. 63/309,470, filed on Feb. 11, 2022, the disclosure of which is hereby incorporated by reference herein in its entirety. The application further claims priority to a CN patent application No. 202210994622.5, filed on Aug. 18, 2022, the disclosure of which is also hereby incorporated by reference herein in its entirety.

BACKGROUND OF THE INVENTION

Field of the Invention

The present application relates to an electronic device, and more particularly to a portable electronic device.

Description of the Prior Art

A common portable electronic device such as a laptop computer is provided with an impact resistant structure between a screen device and an input device. Thus, when the laptop computer is closed, impact between the screen device and the input device is reduced. Moreover, torque received between the screen device and the input device when the laptop computer falls down is also reduced.

However, since the impact resistant structure is a structure that protrudes from a casing, issues such as scratching or collisions are more likely to occur during the use of the laptop computer. For example, an impact resistance structure in a form of a protruding column can be broken due to collisions over an extended period of time.

SUMMARY OF THE INVENTION

In view of the above issues, an electronic device provided according to an embodiment includes a casing, a positioning column and an operating member. The casing includes a first side surface and a second side surface arranged parallel to each other. The positioning column passes through the casing from the first side surface and includes a first end portion and a second end portion. The first end portion movably protrudes from the first side surface, and the second end portion has a first plane and a first convex portion. The operating member is assembled on the casing and corresponds to the positioning column. The operating member includes a push portion. The push portion presses against the second end portion of the positioning column and has a second plane and a second convex portion. When the operating member is located at a first position, the first convex portion correspondingly presses against the second plane, the second convex portion correspondingly presses against the first plane, and the first end portion of the positioning column is accommodated in the casing. When the operating member is located at a second position, the first convex portion correspondingly presses against the second convex portion, and the first end portion of the positioning column protrudes from the first side surface of the casing.

In some embodiments, the positioning column has a guide portion, and the casing has an escort portion corresponding to the guide portion.

In some embodiments, the operating member further includes a control member which is exposed from the casing.

In some embodiments, the casing further includes a passage. The passage is provided on the second side surface, and the control member is exposed from the passage of the casing.

In some embodiments, the casing further includes a third side surface, a fourth side surface and a passage. The third side surface is connected to the fourth side surface. Two opposite sides of the third side surface are connected to the first side surface and the second side surface, respectively. Two opposite sides of the fourth side surface are connected to the first side surface and the second side surface, respectively. The passage is provided from the third side surface to the fourth side surface. The control member is exposed from the passage.

In some embodiments, an elastic member is further included. The elastic member is connected to the positioning column and the operating member.

In some embodiments, a protective member enveloping the first end portion of the positioning column is further included.

In some embodiments, the protective member includes a magnetic member, the positioning column is made of a magnetic metal material, and the magnetic member provides a magnetic attraction force to attract the protective member at the positioning column.

In some embodiments, the positioning column includes a hollow portion, and the protective member includes an extension projecting portion which is inserted in the hollow portion.

In some embodiments, the positioning column is made of a metal material, and the protective member is made of an elastic material. The positioning column includes an assembly portion that is located at the first end portion, and the protective member is formed by means of injection molding on the assembly portion.

In some embodiments, the assembly portion surrounds a side surface of the first end portion, and a surface of the protective member protrudes from a surface of the first end portion of the positioning column.

In some embodiments, the protective member has an outer layer and an inner layer. The outer layer is formed by high hardness rubber, and the inner layer is formed by high damping rubber.

In some embodiments, a base is further included. The base faces the casing, and includes a fifth side surface and a sixth surface parallel to each other and a positioning slot. The positioning slot is located at the fifth side surface, and the positioning slot is for accommodating the first end portion when the first end portion of the positioning column protrudes from the first side surface of the casing.

In some embodiments, the casing has a display surface located on the first side surface or the second side surface, and the base has an input unit located on the fifth side surface.

An electronic device provided according to another embodiment includes a casing, a positioning column and an operating member. The casing includes a first side surface and a second side surface arranged parallel to each other. The positioning column passes through the casing from the first side surface and includes a first end portion and a second end portion. The first end portion movably protrudes from the first side surface. The operating member is assembled on the casing and corresponds to the positioning column. The operating member includes a push portion, which presses against the second end portion of the positioning column. When the operating member is located at a first position, the first end portion of the positioning column is accommodated in the casing. When the operating member is located at a second position, the first end portion of the positioning column protrudes from the first side surface of the casing.

In conclusion, in the electronic device provided according to the above embodiments of the present invention, the first end portion of the positioning column can selectively protrude from the first side surface of the casing through the push portion of the operating member. Thus, when the positioning column is in a state of use, the positioning column protrudes from the first side surface so as to achieve protection effects of being impact resistant. When the positioning column is in a stored state, the positioning column is withdrawn into the casing to as to prevent the positioning column from being collidedor scratching other objects. Thus, impact resistance effects of the electronic device can be maintained while the protruding column structure is prevented from damage.

DETAILED DESCRIPTION OF THE EMBODIMENTS

Figure 1:
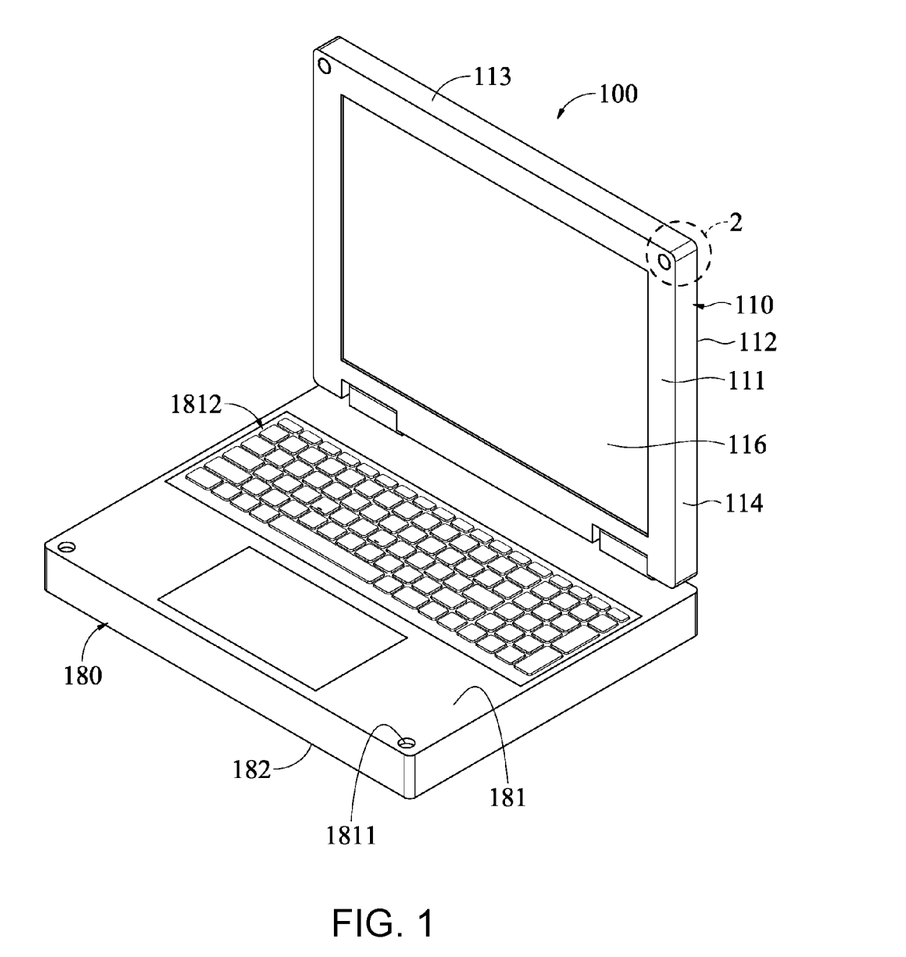
FIG. 1 is a schematic diagram of an electronic device in a state of use according to a first embodiment.
Figure 2:
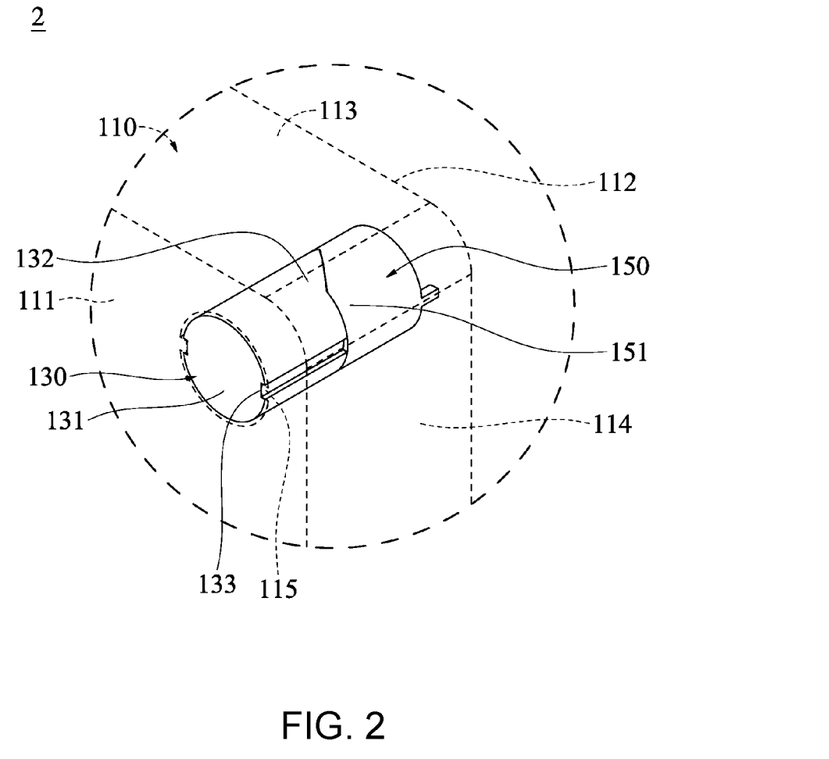
FIG. 2 is an enlarged partial perspective diagram of a circled portion 2 in FIG. 1.
Figure 3:
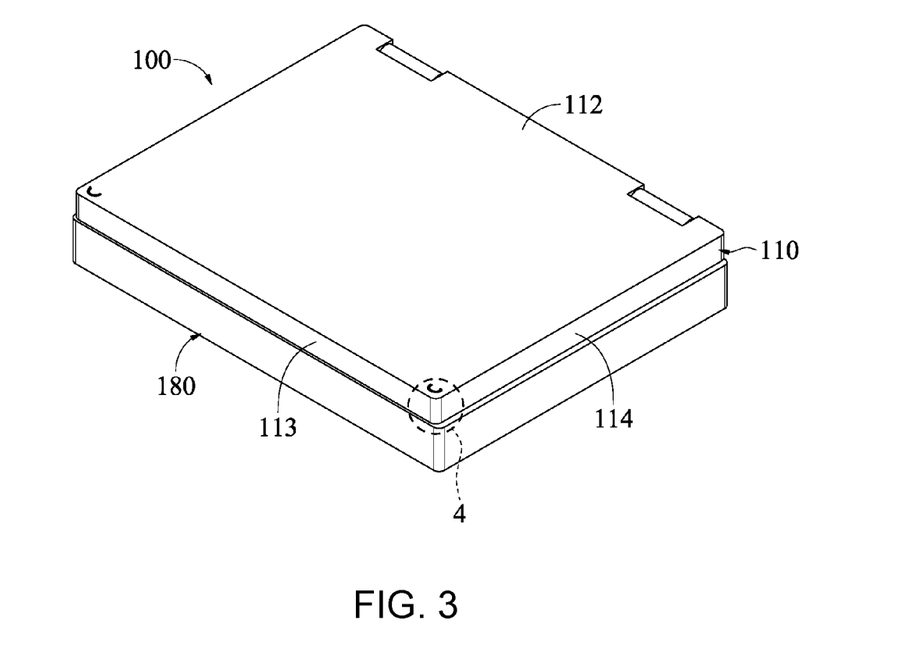
FIG. 3 is a schematic diagram of the electronic device in a stored state according to the first embodiment.
Figure 4:
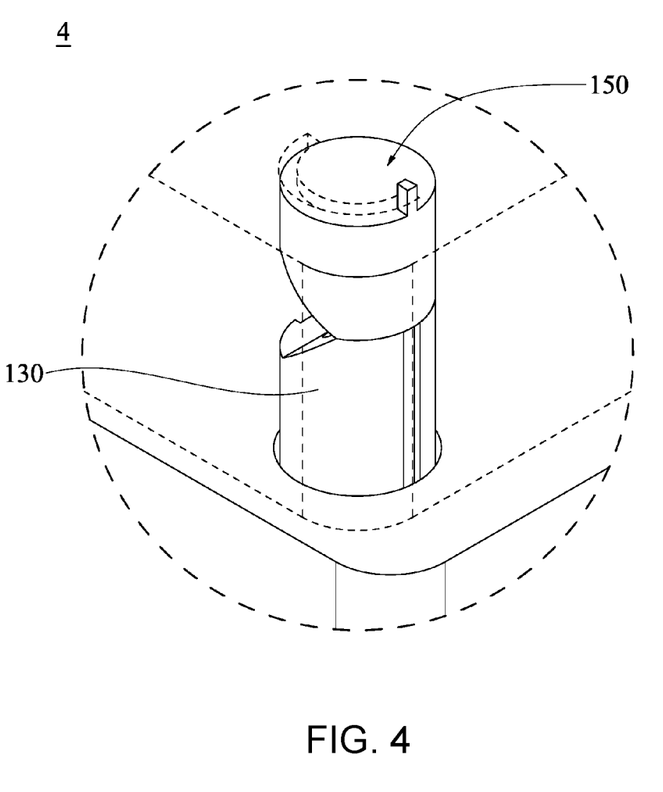
FIG. 4 is an enlarged partial perspective diagram of a circled portion 4 in FIG. 3.
Figure 5:
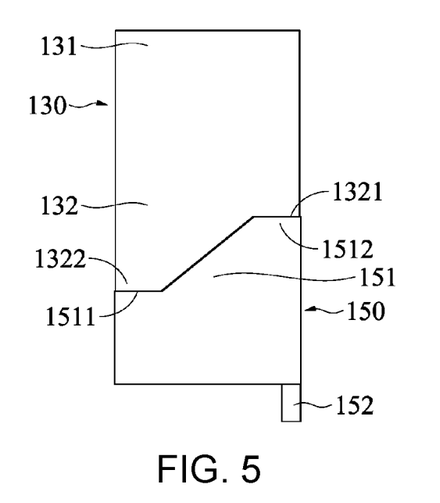
FIG. 5 is a schematic diagram of a positioning column and an operating member at a first position according to the first embodiment.
Figure 6:
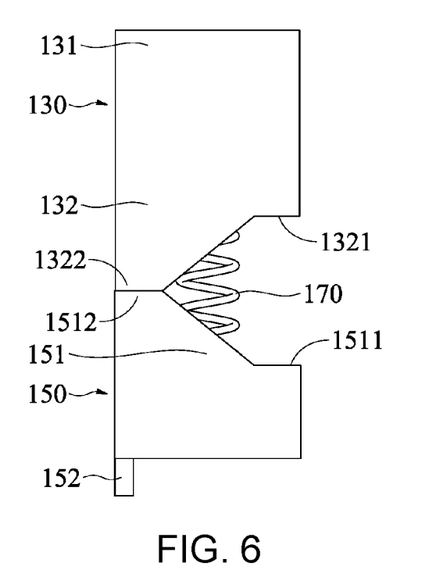
FIG. 6 is a schematic diagram of the positioning column and the operating member at a second position according to the first embodiment.

Refer to FIG. 1 to FIG. 6. FIG. 1 shows a schematic diagram of an electronic device in a state of use according to a first embodiment. FIG. 2 shows an enlarged partial perspective diagram of a circled portion 2 in FIG. 1. FIG. 3 shows a schematic diagram of the electronic device in a stored state according to the first embodiment. FIG. 4 shows an enlarged partial perspective diagram of a circled portion 4 in FIG. 3. FIG. 5 shows a schematic diagram of a positioning column and an operating member at a first position according to the first embodiment. FIG. 6 shows a schematic diagram of the positioning column and the operating member at a second position according to the first embodiment. As shown in FIG. 1 and FIG. 2, an electronic device 100 includes a casing 110, a positioning column 130 and an operating member 150. In a first embodiment, the electronic device is, for example, a laptop computer. In other embodiments, the electronic device is, for example but not limited to, a tablet computer or a keyboard deck.

As shown in FIG. 1 to FIG. 6, the casing 110 includes a first side surface 111 and a second side surface 112 arranged parallel to each other. The positioning column 130 passes through the casing 110 from the first side surface 111 and includes a first end portion 131 and a second end portion 132. The first end portion 131 movably protrudes from the first side surface 111.

The operating member 150 is assembled on the casing 110 and corresponds to the positioning column 130. The operating member 150 includes a push portion 151 which presses against the second end portion 132 of the positioning column 130.

As shown in FIG. 5, when the operating member 150 is located at a first position, the first end portion 131 of the positioning column 130 is accommodated in the casing 110. As shown in FIG. 6, when the operating member 150 is located at a second position in response to a rotation operation, the push portion 151 presses against the second end portion 132, such that the first end portion 131 of the positioning column 130 protrudes from the first side surface 111 of the casing 110.

In the first embodiments, as shown in FIG. 1 to FIG. 6, the first position refers to a stored state of the positioning column 130 (as the details shown in FIG. 1 and FIG. 2), that is, the positioning column 130 is stored in the casing 110. When a user is currently using the electronic device 100 or the electronic device 100 is in an open state, the first end portion 131 of the positioning column 130 can be accommodated in the casing 110, so as to prevent the first end portion 131 from protruding from the casing 110 and causing issues such as collisions of the first end portion 131 or scratching of other objects by the first end portion 131. As shown in FIG. 3 and FIG. 4, a second position refers to a state of use of the positioning column 130, that is, the positioning column 130 protrudes from the casing 110. When the user is to close the electronic device 100 or the electronic device 100 is in a closed state, the positioning column 130 can be pushed by the push portion 151 of the operating member 150 to have the first end portion 131 of the positioning column 130 protrude from the first side surface 111 of the casing 110, so as to provide the electronic device 100 with impact resistant effects.

More specifically, with the push portion 151 of the operating member 150, the first end portion 131 of the positioning column 130 can selectively protrude from the first side surface 111 of the casing 110. When the positioning column 130 is in the state of use, the positioning column 130 protruding from the first side surface 111 can press against a base 180, preventing direct large-area impact between the casing 110 and the base 180 and hence achieving protection effects of being impact resistant. When the positioning column 130 is in the stored state, the positioning column 130 is withdrawn into the casing 110 to as to prevent the positioning column 130 from being collided or scratching other objects. Thus, impact resistant effects of the electronic device can be maintained while the protruding column structure is prevented from damage.

In the first embodiment, the second end portion 132 has a first plane 1321 and a first convex portion 1322, and the push portion 151 has a second plane 1511 and a second convex portion 1512. Referring to FIG. 5 and FIG. 6 again, when the operating member 150 is located at the first position, the first convex portion 1322 correspondingly presses against the second plane 1511, the second convex portion 1512 correspondingly presses against the first plane 1321, and the first end portion 131 of the positioning column 130 is accommodated in the casing 110. When the operating member 150 is located at the second position in response to a rotation operation, the second convex portion 1512 correspondingly presses against the first convex portion 1322, such that the first end portion 131 of the positioning column 130 protrudes from the first side surface 111 of the casing 110.

Figure 7:
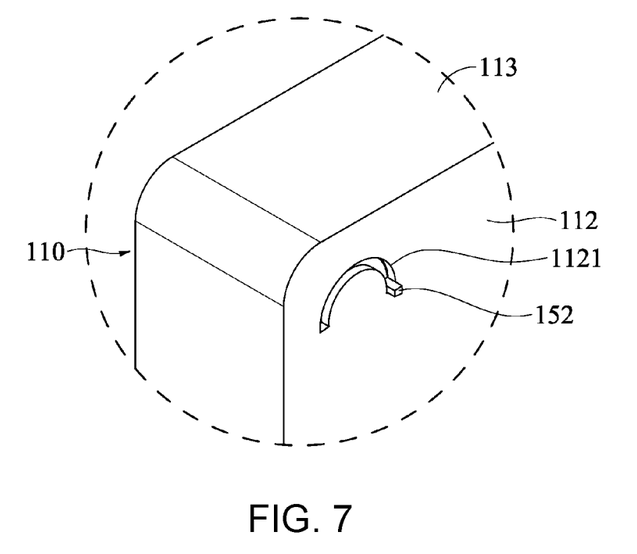
FIG. 7 is a schematic diagram of the operating member in FIG. 4 at the first position from another angle.
Figure 8:
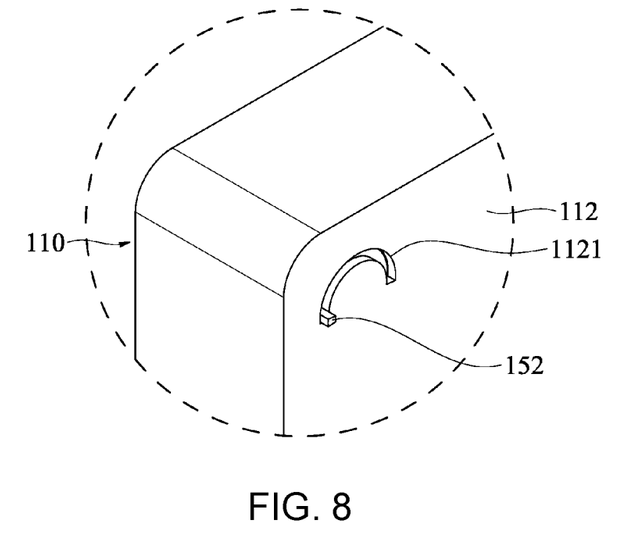
FIG. 8 is a schematic diagram of the operating member in FIG. 7 at the second position.

In the first embodiment, the positioning column 130 receives a force of action and is selectively accommodated in the casing 110 or protrudes from the first side surface 111 of the casing 110. For example, as shown in FIG. 7 and FIG. 8, when the positioning column 130 is to be in the state of use, the user toggles the operating member 150 from the second side surface 112 by a finger to change the operating member 150 from the first position (FIG. 7) to the second position (FIG. 3), such that the push portion 151 presses against the positioning column 130, and the first end portion 131 of the positioning column 130 then protrudes from the first side surface 111 of the casing 110 from the casing 110. As shown in FIG. 5 and FIG. 6, when the user toggles the operating member 150, the second convex portion 1512 of the push portion 151 moves or turns relative to the positioning column 130 along a toggle direction. More specifically, during the movement of the second convex portion 1512 to the corresponding first convex portion 1322, because the second convex portion 1512 moves along an inclined surface of the first convex portion 1322, the second convex portion 1512 gradually pushes the first convex portion 1322 so as to cause the first end portion 131 of the positioning column 130 to protrude from the first side surface 111 of the casing 110. When the positioning column 130 is to be in the stored state, the user again toggles the operating member 150 from the second side surface 112 by a finger to change the operating member 150 from the second position to the first position, thus releasing the pressing of the push portion 151 against the positioning column 130, so that user can push the positioning column 130 from the first side surface 111 into the casing 110 by a finger. For another example, in other embodiments, the operating member 150 is electrically connected to a control device of the electronic device 100. A user can control, through a physical button on the electronic device 100 or a virtual button on a display surface, the operating member 150 to move between the first position and the second position, so as to have the positioning column 130 selectively be accommodated in the casing 110 or protrude from the first side surface 111 of the casing 110.

Refer to FIG. 7 and FIG. 8 as well as FIG. 5 and FIG. 6. FIG. 7 shows a schematic diagram of the operating member in FIG. 4 at the first position from another angle. FIG. 8 shows a schematic diagram of the operating member in FIG. 7 at the second position. As shown in FIG. 5 to FIG. 8, in the first embodiment, the operating member 150 further includes a control member 152 which is exposed from the casing 110. The control member 152 is, for example, a rod-like object for the user to easily hold so as to toggle the operating member 150. As shown in FIG. 7 and FIG. 8, the casing 110 further includes a passage 1121. The passage 1121 is provided on the second side surface 112, and the control member 152 is exposed from the passage 1121 of the casing 110. In the first embodiment, the control member 152 is movable along the channel 1121 to alter the operating member 150 between the first position and the second position. For example, the user holds the control member 152 from the second side surface 112, moves the control member 152 along the passage 1121 and toggles the operating member 150, so as to move the operating member 150 from the first position in FIG. 5 and FIG. 7 to the second position in FIG. 6 and FIG. 8. As such, the user can toggle the operating member 150 from the second side surface 112 by a finger to alter the operating member 150 between the first position (FIG. 7) and the second position (FIG. 8).

Referring to FIG. 5 and FIG. 6 again, in the first embodiment, the electronic device 100 further includes an elastic member 170. The elastic member 170 is connected to the positioning column 130 and the operating member 150, so as to enable the positioning column 130 to be more stably accommodated in the casing 110 under an influence of elastic force. When the positioning column 130 is to be in the state of use, the user toggles the operating member 150 from the second side surface 112 by a finger to change the operating member 150 from the first position to the second position. Since the second convex portion 1512 presses against the first convex portion 1322, the first end portion 131 of the positioning column 130 overcomes the elastic force and protrudes from the first side surface 111 of the casing 110. When the positioning column 130 is to be in the stored state, the user toggles the operating member 150 from the second side surface 112 by a finger to change the operating member 150 from the second position to the first position. Since the second convex portion 1512 no longer presses against the first convex portion 1322, the positioning column 130 is withdrawn into the casing 110 under the influence of the elastic force, thus eliminating the step of pushing the positioning column 130 back into the casing 110 by a finger of the user.

Referring to FIG. 2 again, in the first embodiment, the positioning column 130 has a guide portion 133, and the casing 110 has an escort portion 115 facing the guide portion 133, such that the positioning column 130 moves along the escort portion 115 to protrude from the first side surface 111 or be accommodated in the casing 110.

Referring to FIG. 1 again, FIG. 2 and FIG. 3, in the first embodiment, the casing 110 further includes a third side surface 113 and a fourth side surface 114 connected to each other. Two opposite sides of the third side surface 113 are connected to the first side surface 111 and the second side surface 112, respectively. Two opposite sides of the fourth side surface 114 are connected to the first side surface 111 and the second side surface 112, respectively. The positioning column 130 is adjacent to a junction of the third side surface 113 and the fourth side surface 114. The electronic device 100 further includes the base 180. The base 180 pivots at and faces the casing 110. The base 180 includes a fifth side surface 181 and a sixth side surface 182 parallel to each other, and a positioning slot 1811. The positioning slot 1811 is located on the fifth side surface 181. When the first end portion 131 of the positioning column 130 protrudes from the first side surface 111 of the casing 110, the positioning slot 1811 is for accommodating the first end portion 131. Thus, the torsion resistance between the casing 110 and the base 180 is increased. When the electronic device 100 falls down, a limiting effect is provided since the first end portion 131 is accommodated in the positioning slot 1811, preventing a pivot between the casing 110 and the base 180 of the electronic device 100 from damage caused by the impact of the falling. In the first embodiments, the casing 110 has a display surface 116 located on the first side surface 111 or the second side surface 112, and the base 180 has an input unit 1812 located on the fifth side surface 181. Herein, the display surface 116 is located on the first side surface 111, and the input unit 1812 is, for example, a keyboard or a touch pad and is located on the fifth side surface 181. Further, the positioning column 130 is located outside the display surface 116 of the first side surface 111 and is adjacent to a junction of the third side surface 113 and the fourth side surface 114.

Figure 9:
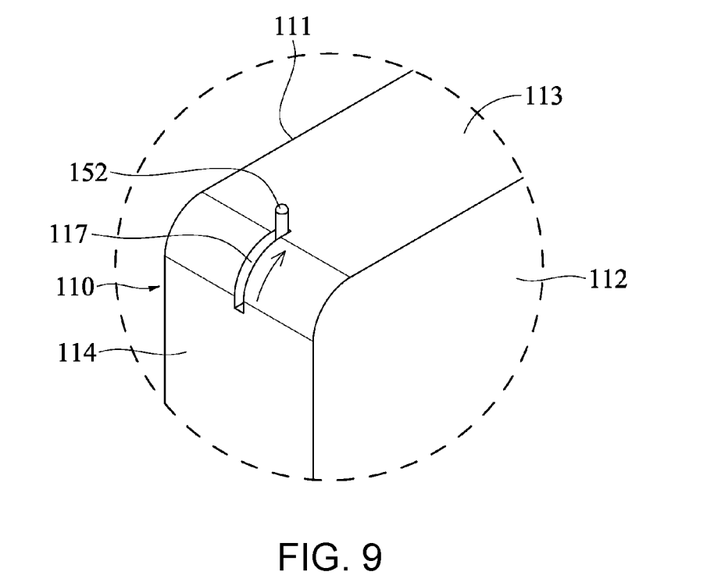
FIG. 9 is a schematic diagram of an operating member at a first position according to a second embodiment.
Figure 10:
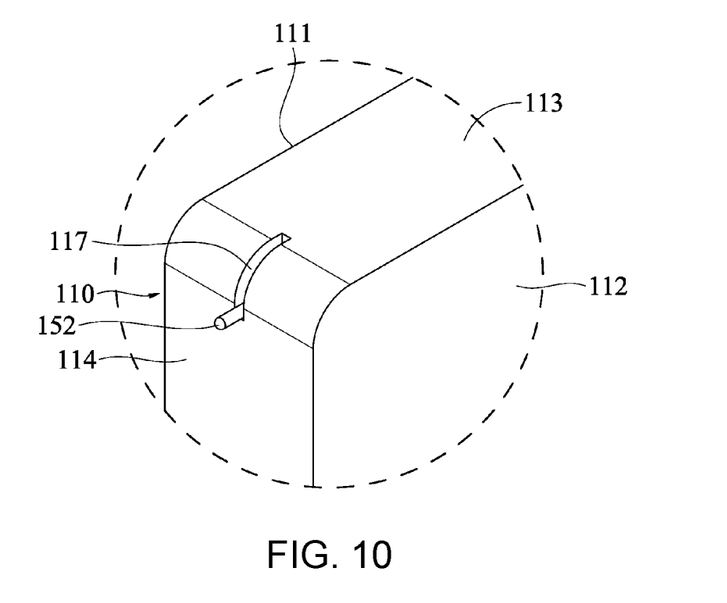
FIG. 10 is a schematic diagram of the operating member at a second position according to the second embodiment.

Refer to FIG. 9 to FIG. 10. FIG. 9 shows a schematic diagram of an operating member at a first position according to a second embodiment. FIG. 10 shows a schematic diagram of the operating member at a second position according to the second embodiment. Details of structures of the second embodiment similar to those of the first embodiment are omitted herein. This embodiment differs from the first embodiment in that the passage and the control member have different implementation forms. In the second embodiment, the casing 110 further includes a third side surface 113, a fourth side surface 114 and a passage 117. The third side surface 113 is connected to the fourth side surface 114. Two opposite sides of the third side surface 113 are connected to the first side surface 111 and the second side surface 112, respectively. The passage 117 is provided from the third side surface 113 to the fourth side surface 114. The control member 152 is exposed from the passage 117. More specifically, the passage 117 extends from the third side surface 113 to the fourth side surface 114, and the control member 152 is movable between the third side surface 113 and the fourth side surface 114 along the passage 117. For example, the user holds the control member 152 from the third side surface 113, and moves the control member 152 along the passage 117 to drive the operating member 150, so as to move the operating member 150 from the first position in FIG. 9 to the second position in FIG. 10. As such, the control member 152 is provided on the passage 117 at the third side surface 113 and the fourth side surface 114, such that the user is allowed to more directly observe the control member 152 and to more conveniently perform the operation.

Figure 11:
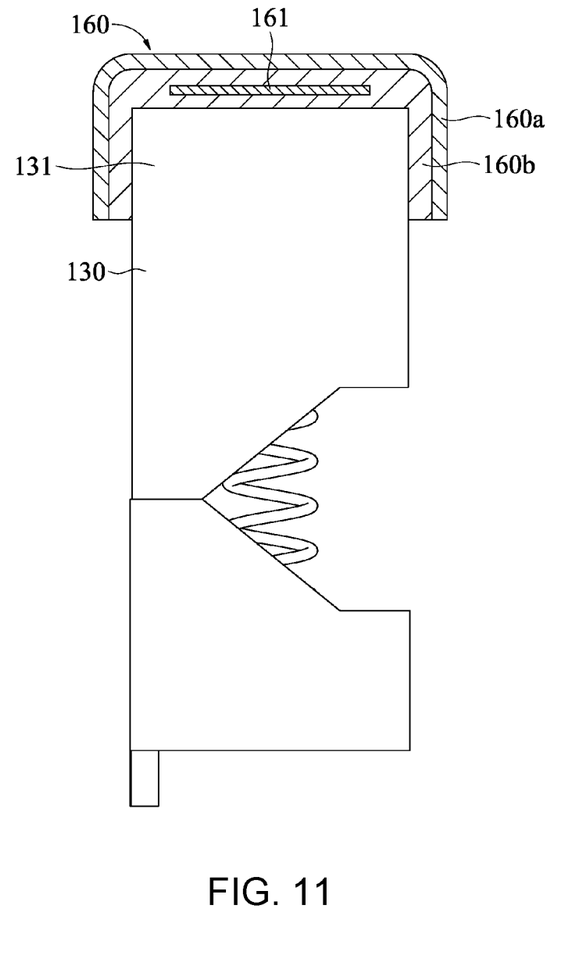
FIG. 11 is a schematic diagram of a positioning column according to a third embodiment.

Refer to FIG. 11. FIG. 11 shows a schematic diagram of a positioning column according to a third embodiment. In the third embodiment, the electronic device 100 further includes a protective member 160 which envelopes the first end portion 131 of the positioning column 130. The protective member 160 has an outer layer 160*a* and an inner layer 160*b*. The outer layer 160*a* is made of a high hardness rubber, and the inner layer 160*b* is made of a high damping rubber. The protective member enveloping the positioning column is implemented in various forms, with details of other implementation forms to be described shortly. As shown in FIG. 11, in the third embodiment, the protective member 160 includes a magnetic member 161, the positioning column 130 is made of a magnetic metal material, and the magnetic member 161 provides a magnetic attraction force to attract the protective member 160 at the positioning column 130. In the third embodiment, the magnetic member 161 is, for example, a magnet. One or more magnets 161 are embedded in the protective member 160, such that the protective member 160 is attracted to and envelops the first end portion 131 of the positioning column 130, thereby enhancing anti-collision and protective effects of the positioning column 130.

Figure 12:
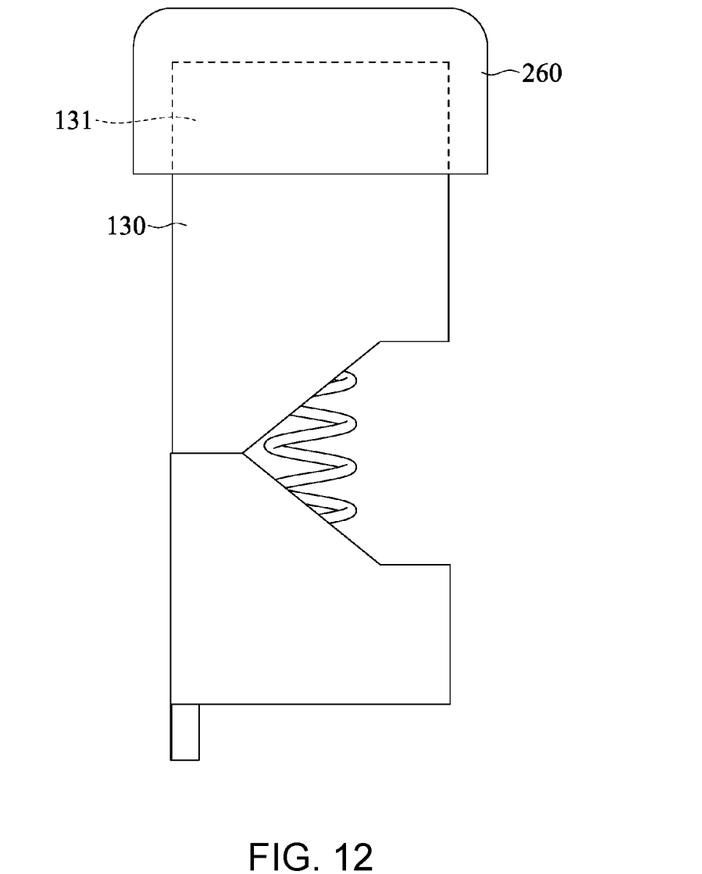
FIG. 12 is a schematic diagram of a positioning column according to a fourth embodiment.
Figure 13:
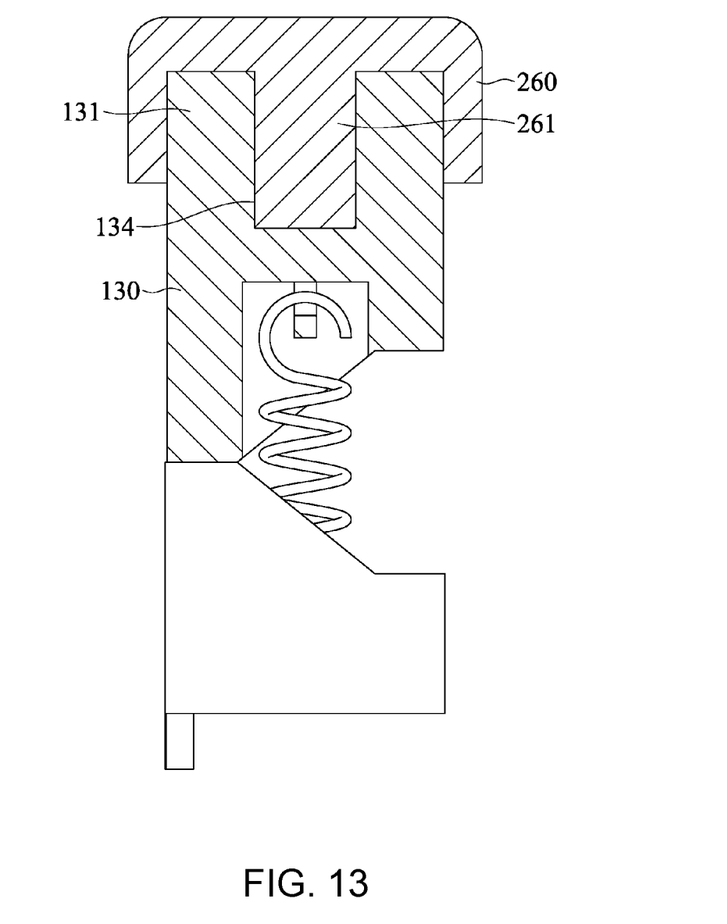
FIG. 13 is a sectional schematic diagram of the positioning column in FIG. 12.

Refer to FIG. 12 to FIG. 13. FIG. 12 shows a schematic diagram of a positioning column according to a fourth embodiment. FIG. 13 shows a sectional schematic diagram of the positioning column in FIG. 12. Regarding other implementation forms of the protective member enveloping the positioning column, similar structural details of the protective member are omitted herein. In the fourth embodiment, as shown in FIG. 12 and FIG. 13, the positioning column 130 includes a hollow portion 134, a protective member 260 includes an extension projecting portion 261, and the extension projecting portion 261 is inserted in the hollow portion 134. In the fourth embodiment, the protective member 260 is formed as a column-like extension projecting portion 261. By packing and securing the column-like extension projecting portion 261 in the hollow portion 134 of the positioning column 130, the protective member 260 is enabled to envelop the first end portion 131 of the positioning column 130.

Figure 14:
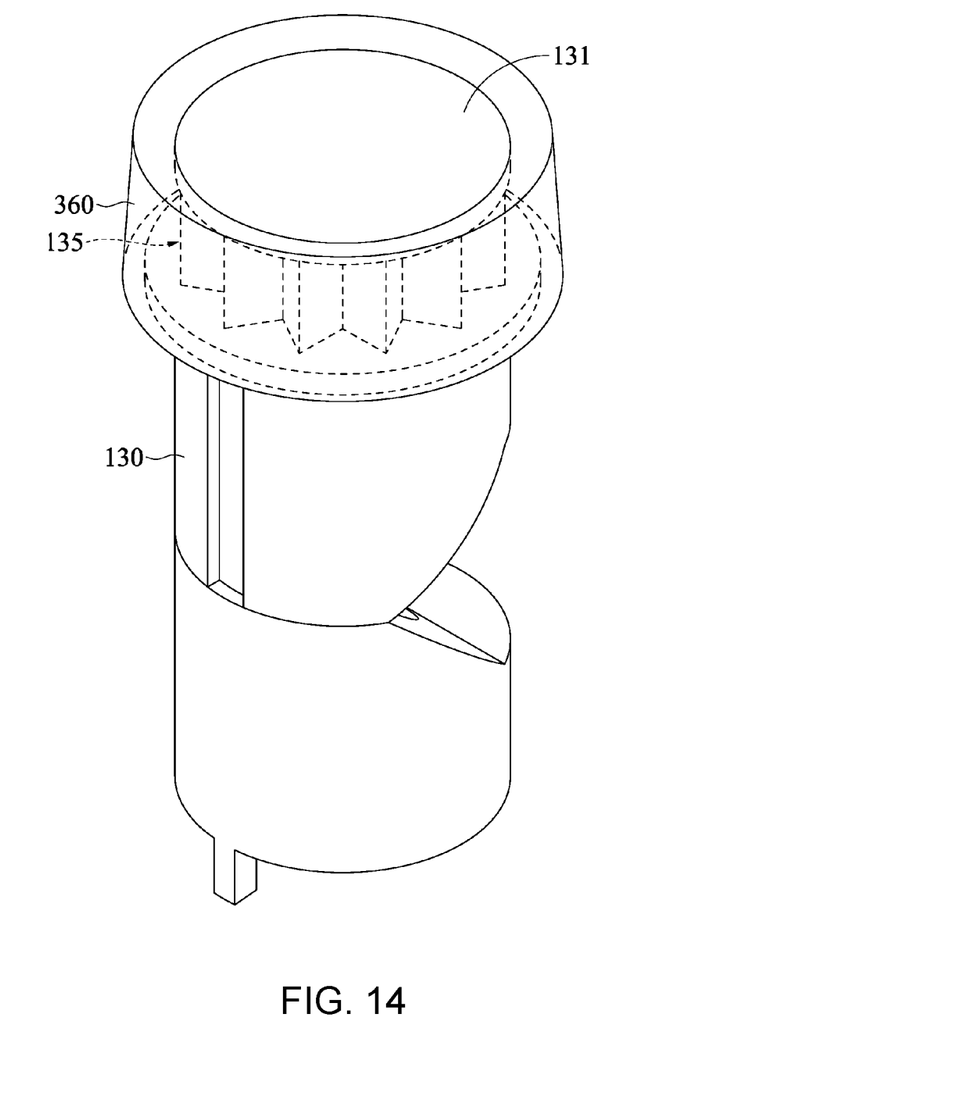
FIG. 14 is a partial perspective schematic diagram of a positioning column according to a fifth embodiment.

Refer to FIG. 14. FIG. 14 shows a partial perspective schematic diagram of a positioning column according to a fifth embodiment. Regarding other implementation forms of the protective element enveloping the positioning column, in the fifth embodiment, as shown in FIG. 14, the positioning column 130 is made of a metal material, and a protective member 360 is made of an elastic material. The positioning column 130 includes an assembly portion 135 that is located at the first end portion 131, and the protective member 360 is formed by means of injection molding on the assembly portion 135. The assembly portion 135 surrounds a side surface of the first end portion 131, and a surface of the protective member 360 protrudes from a surface of the first end portion 131 of the positioning column 130. In the fifth embodiment, the protective member 360 is, for example, made of plastic, rubber or silicone. In the fifth embodiment, the assembly portion 135 has a serrated structure, and the protective member 360 for corresponding engagement is directly formed on the assembly portion 135 of the positioning column 130 so as to provide mutual engagement. In the fifth embodiment, the assembly portion 135 is, for example but not limited to, a serrated structure, and any shape capable of achieving an engagement structure can be used. Moreover, a surface of the protective member 360 slightly protrudes from a surface of the first end portion 131 of the positioning column 130, so as to prevent the first end portion 131 of the positioning column 130 from directly coming into contact with the base 180, an external device or a user, hence protecting the positioning column 130 and providing buffering effects.

In conclusion, in the electronic device 100 provided according to above embodiments, with the push portion 151 of the operating member 150, the first end portion 131 of the positioning column 130 can selectively protrude from the first side surface 111 of the casing 110. When the positioning column 130 is in the state of use, the positioning column 130 protruding from the first side surface 111 can press against the base 180, preventing direct large-area impact between the casing 110 and the base 180 and hence achieving protection effects of being impact resistant. When the positioning column 130 is in the stored state, the positioning column 130 is withdrawn into the casing 110 to as to prevent the positioning column 130 from being collided or scratching other objects. Thus, impact resistant effects of the electronic device 100 can be maintained while the protruding column structure is prevented from damage.

What is claimed is:

1. An electronic device, comprising:
   a casing comprising a first side surface and a second side surface arranged parallel to each other;
   a positioning column passing through the casing from the first side surface, and the positioning column comprising a first end portion and a second end portion, the first end portion movably protruding from the first side surface, and the second end portion having a first plane and a first convex portion; and an operating member assembled on the casing and corresponding to the positioning column, the operating member comprising a push portion, the push portion pressing against the second end portion of the positioning column and having a second plane and a second convex portion, and the operating member configured to rotate relative to the positioning column in an axial direction extending perpendicular to the first side surface;

wherein when the operating member is located at a first position, the first convex portion correspondingly presses against the second plane, the second convex portion correspondingly presses against the first plane, and the first end portion of the positioning column is accommodated in the casing; when the operating member is located at a second position, the second convex portion correspondingly presses against the first convex portion, such that the first end portion of the positioning column protrudes from the first side surface of the casing.

2. The electronic device according to claim 1, wherein the positioning column has a guide portion, and the casing has an escort portion corresponding to the guide portion.

3. The electronic device according to claim 2, wherein the operating member further comprises a control member exposed from the casing.

4. The electronic device according to claim 3, wherein the casing further comprises a passage provided on the second side surface, and the control member is exposed from the passage of the casing.

5. The electronic device according to claim 3, wherein the casing further comprises a third side surface, a fourth side surface and a passage; the third side surface is connected to the fourth side surface, two opposite sides of the third side surface are connected to the first side surface and the second side surface, respectively, and two opposite sides of the fourth side surface are connected to the first side surface and the second side surface, respectively; and the passage is provided from the third side surface to the fourth side surface, and the control member is exposed from the passage.

6. The electronic device according to claim 1, further comprising:
an elastic member connected to the positioning column and the operating member.

7. The electronic device according to claim 1, further comprising:
a protective member enveloping the first end portion of the positioning column.

8. The electronic device according to claim 7, wherein the protective member comprises a magnetic member, the positioning column is made of a magnetic metal material, and the magnetic member provides a magnetic attraction force to attract the protective member at the positioning column.

9. The electronic device according to claim 7, wherein the positioning column comprises a hollow portion, and the protective member comprises an extension projecting portion which is inserted in the hollow portion.

10. The electronic device according to claim 7, wherein the positioning column is made of a metal material, the protective member is made of an elastic material, the positioning column comprises an assembly portion that is located on the first end portion, and the protective member is formed by means of injection molding on the assembly portion.

11. The electronic device according to claim 10, wherein the assembly portion surrounds a side surface of the first end portion, and a surface of the protective member protrudes from a surface of the first end portion of the positioning column.

12. The electronic device according to claim 7, wherein the protective member has an outer layer and an inner layer, the outer layer is formed by high hardness rubber, and the inner layer is formed by high damping rubber.

13. The electronic device according to claim 1, further comprising:
a base facing the casing, and the base comprising a fifth side surface and a sixth side surface parallel to each other and a positioning slot, the positioning slot located at the fifth side surface, and the positioning slot accommodating the first end portion when the first end portion of the positioning column protrudes from the first side surface of the casing.

14. The electronic device according to claim 13, wherein the casing has a display surface located on the first side surface or the second side surface, and the base has an input unit located on the fifth side surface.

15. An electronic device, comprising:
a casing comprising a first side surface and a second side surface arranged parallel to each other;
a positioning column passing through the casing from the first side surface, the positioning column comprising a first end portion and a second end portion, and the first end portion movably protruding from the first side surface; and
an operating member, assembled on the casing and corresponding to the positioning column, the operating member comprising a push portion, the push portion pressing against the second end portion of the positioning column, and the operating member configured to rotate relative to the positioning column in an axial direction extending perpendicular to the first side surface;
wherein, when the operating member is located at a first position, the first end portion of the positioning column is accommodated in the casing; when the operating member is located at a second position, the first end portion of the positioning column protrudes from the first side surface of the casing.

16. The electronic device according to claim 15, wherein the casing has a display surface located on the first side surface or the second side surface.

17. The electronic device according to claim 16, wherein the casing further comprises a third side surface and a fourth side surface that are connected to each other, two opposite sides of the third side surface are connected to the first side surface and the second side surface, respectively, two opposite sides of the fourth side surface are connected to the first side surface and the second side surface, respectively, and the positioning column is adjacent to a junction of the third side surface and the fourth side surface.

18. The electronic device according to claim 17, wherein the positioning column is located outside the display surface and adjacent to the junction of the third side surface and the fourth side surface.

19. The electronic device according to claim 17, further comprising:
a base, the base pivoted at and facing the casing, the base comprising a fifth side surface and a sixth side surface parallel to each other and a positioning slot, the positioning slot located at the fifth side surface, and the positioning slot accommodating the first end portion when the first end portion of the positioning column protrudes from the first side surface of the casing.

20. The electronic device according to claim 16, further comprising:
a protective member enveloping the first end portion of the positioning column.

* * * * *